（12）United States Patent
Petkov et al.

(10) Patent No.: US 10,209,092 B2
(45) Date of Patent: Feb. 19, 2019

(54) METHOD FOR ACQUIRING AND COMMUNICATING DATA OF A SMART-METERING METER AND DEVICE FOR EXECUTING THE METHOD

(71) Applicant: DIEHL METERING SYSTEMS GMBH, Nuremberg (DE)

(72) Inventors: Hristo Petkov, Nuremberg (DE); Thomas Lautenbacher, Erlangen (DE); Thomas Kauppert, Nuremberg (DE); Klaus Gottschalk, Winkelhaid (DE)

(73) Assignee: Diehl Metering Systems GmbH, Nuremberg (DE)

( * ) Notice: Subject to any disclaimer, the term of this patent is extended or adjusted under 35 U.S.C. 154(b) by 0 days.

(21) Appl. No.: 15/659,912

(22) Filed: Jul. 26, 2017

(65) Prior Publication Data

US 2018/0031390 A1    Feb. 1, 2018

(30) Foreign Application Priority Data

Jul. 28, 2016 (DE) .......................... 10 2016 009 158
Aug. 18, 2016 (DE) .......................... 10 2016 010 047

(51) Int. Cl.
  *G01D 4/00* (2006.01)
  *H04W 84/12* (2009.01)

(52) U.S. Cl.
  CPC ............. *G01D 4/006* (2013.01); *G01D 4/004* (2013.01); *H04Q 2209/10* (2013.01); *H04Q 2209/40* (2013.01); *H04Q 2209/60* (2013.01); *H04W 84/12* (2013.01)

(58) Field of Classification Search
  CPC ..... G01D 4/004; G01D 4/006; H04Q 2209/60
  See application file for complete search history.

(56) References Cited

U.S. PATENT DOCUMENTS

| | | | |
|---|---|---|---|
| 2005/0184881 A1* | 8/2005 | Dusenberry ............ | H04Q 9/00 340/870.02 |
| 2008/0150751 A1* | 6/2008 | Sala ........................ | G01D 4/00 340/870.02 |
| 2009/0146838 A1* | 6/2009 | Katz ...................... | G01D 4/006 340/870.02 |
| 2009/0153356 A1* | 6/2009 | Holt ....................... | G01D 4/004 340/870.02 |

* cited by examiner

*Primary Examiner* — Omeed Alizada
(74) *Attorney, Agent, or Firm* — Laurence A. Greenberg; Werner H. Stemer; Ralph E. Locher

(57) ABSTRACT

Mobile units moving in a local network environment and at times in the vicinity of meters of the network, at least temporarily bypass relay functions of a concentrator operated in a stationary manner, if the relay function is not yet available, for instance during construction, for radio communication of data packets of the meter linked into the smart-metering network to a center. The mobile units are persons and/or vehicles with communication devices such as smartphones for long-distance links over the Internet or in the mobile radio standard. The communication devices, as modified mobile radio telephones, receive data packets from meters by using hardware or a software app over a short-distance link to the mobile unit being accidentally temporarily located in the vicinity of the meter. Long-distance communication of packets from mobile unit to center then takes place over the Internet or the mobile radio standard.

11 Claims, 1 Drawing Sheet

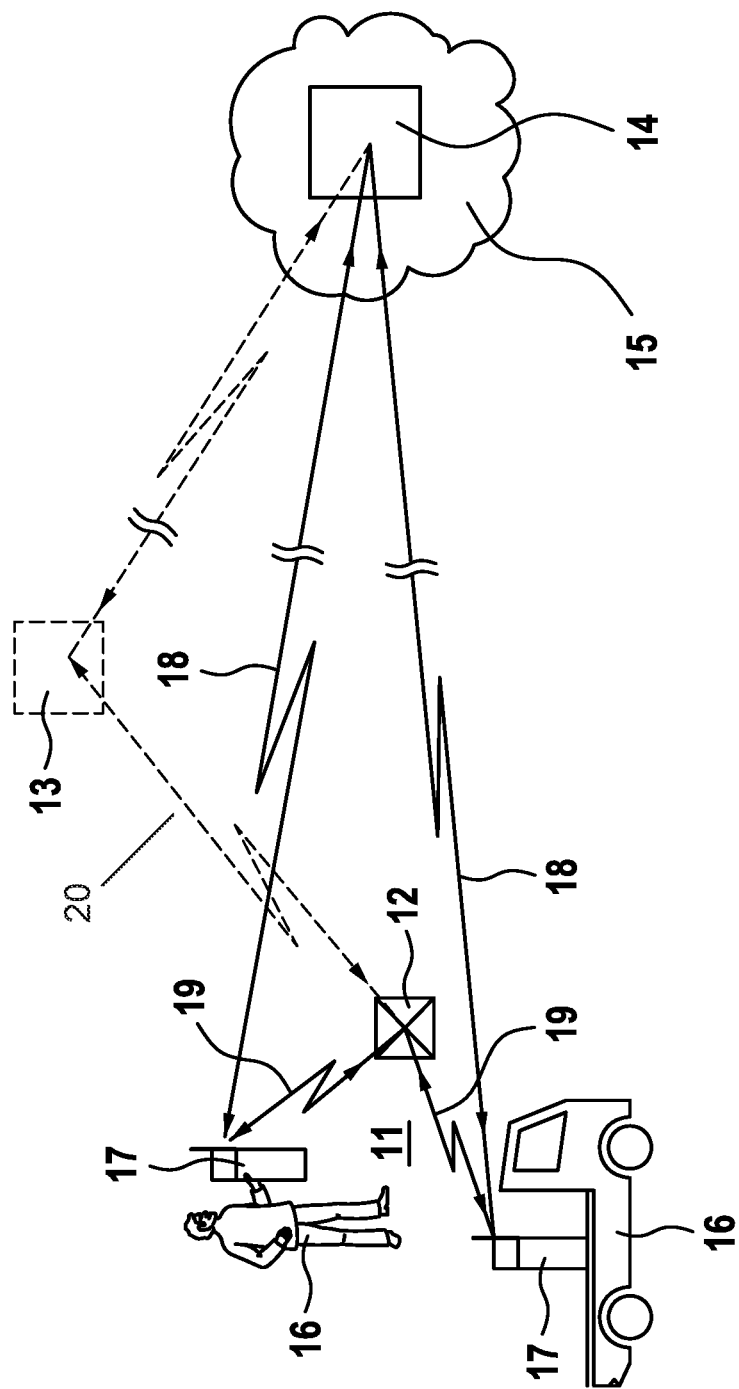

METHOD FOR ACQUIRING AND COMMUNICATING DATA OF A SMART-METERING METER AND DEVICE FOR EXECUTING THE METHOD

CROSS-REFERENCE TO RELATED APPLICATION

This application claims the priority, under 35 U.S.C. § 119, of German Patent Application DE 10 2016 009 158.4, filed Jul. 28, 2016 and of German Patent Application DE 10 2016 010 047.8, filed Aug. 18, 2016; the prior applications are herewith incorporated by reference in their entirety.

BACKGROUND OF THE INVENTION

Field of the Invention

In smart metering, the aim is to equip each point of consumption for line-connected energy sources such as power, gas, water or remote heat, with a meter for signals generated by a measuring mechanism in dependence on consumption, and also with a transmitting module for wireless short-distance packet communication of the digitized meter reading currently being accumulated, over one of the ISM frequency bands which are accessible free of license to a concentrator performing a relay function and being operated in a stationary manner. The concentrator receives and stores the packets (also called messages) individualized by meter addresses and received comparatively frequently by various meters operated in its area of reception, and may perform preprocessing, for instance for data plausibility checking. The data temporarily stored in concentrators are communicated over long-distance data radio, preferably in a mobile radio standard through mobile radio base stations, comparatively rarely to a center, for instance to the head end server operated in an accounting center or in an operational management center of the energy supply company for this energy source. However, it may also be located in a cloud.

It may happen, for example in the course of building projects, that smart-metering meters are already mounted and placed into operation with location documentation even before a concentrator is first mounted or set up for receiving data from those meters and for forwarding to the center at all or that, in the course of extension work, a point of consumption has to be shifted temporarily into an adjacent position together with its meter, at which position, however, a secured radio link to a concentrator which has already been placed into operation is no longer provided—until later when a reliable radio contact is established to an operationally ready concentrator in a final operating position, if necessary by alignment of an antenna or enhancing the radio power of the meter transmitter.

SUMMARY OF THE INVENTION

It is accordingly an object of the invention to provide a method for acquiring and communicating data of a smart-metering meter and a device for executing the method, which overcome the technical problem of being able to acquire and forward data from meters to central processing even in the case of (still) lacking functional readiness of a stationarily operated concentrator.

In this context, it is not only a matter of being able to already acquire consumption data during the performance of, for instance, a construction project and possibly being able to bill a provider therefor, e.g. during the hot-drying of a new construction object, but also damage surveillance. Since it is exactly when consumption points already equipped with the meters are initially only configured provisionally and brought to the final operating position later that due to the associated manipulations, the risk of later connection leakages or even line breaks, not noticed immediately exists. However, they can be detected unambiguously and also located rapidly through the identity address of the affected meter if an abnormal change in the energy delivery is indicated there at the center—if thus such a significant change is noticed by somebody even though the relay function for the data transmission from that meter through the concentrator to the center, as stated is (not yet) in operation. In this way, unnecessary energy consumption can then also be found, for instance due to power consumption for night illumination in an area in which no regular work is occurring at present.

With the foregoing and other objects in view there is provided, in accordance with the invention, a method for radio communication of data packets of a meter linked into a smart-metering network through a relay station to a center. The method comprises locating at least one mobile unit, equipped with a communication device as the relay station, in an area of the network; and using the communication device to receive at least one data packet over a short-distance link from the meter and establishing a long-distance link for communicating the at least one data packet to the center.

With the objects of the invention in view, there is also provided a device acting as a relay station for the radio communication of data packets from a meter in a smart-metering network to a center. The device comprises a mobile unit equipped with a communication device being an Internet-capable mobile telephone configured for communication over ISM channels with respect to hardware and/or software.

Accordingly, it is provided to equip at least one unit—referred to herein as a called mobile—provisionally with a communication device operating bidirectionally. The mobile unit can be a contact person such as, for instance, an overseer, a fitter or a foreman who is active in the building project at least from time to time, or the driver of a delivery vehicle repeatedly driving to this building project, or building rubble removal. During a more or less random temporary approach to a meter, the transceiver receiver of the communication device records its data packet sent out repeatedly with the currently accumulated meter reading. The transmitter of the meter is then already operating in the standard provided for later regular operation, particularly with data transmission in one of the ISM bands accessible free of license with a transmission protocol according to IEEE 802.15.4, according to wMbus or in the WLAN or Bluetooth standard. However, during this operating phase the transmitters of the meters can initially still be operated with reduced transmission power, saving battery since an occasionally relative close approach of the mobile unit to a meter can be expected at least at a shorter distance than with later regular operation to the concentrator. The information communicated with the set of data from the meter through the instantaneous short-distance link to the communication device of the mobile unit does not need to be subjected to any data preprocessing in the communication device. This is because the latter basically performs a relay function in that the consumption data received as a packet are presently forwarded packet by packet from the communication device to the server of the processing center operated at the head end or in the cloud, respectively. This can happen, for instance, through a DSL access of the communication device to an Internet link or through a radio link in the mobile radio standard. The communication device is configured for the frequency and protocol conversion required for the long-distance link compared with the preceding short-distance contact from the meter, similar to the concentrator at other times.

This forwarding of the received meter data by the communication device does not need to occur instantaneously. In the interest of minimum additional loading of the battery in the mobile communication device, the packets of the current meter data are suitably initially temporarily stored in the communication device, instead, and only forwarded as an appendix (particularly in so-called piggybacking) to a long-distance transmission link set up in any case from time to time due to operations to the center. As a result, the energy supply in the communication device is not loaded for the relay function of forwarding the meter data alone. With piggybacking, there is virtually no additional loading of the energy balance of the communication device (that is to say the accumulator in the mobile telephone) because the volume of data of meter information is minimal in comparison with the quantities of data exchanged in any case during telephone calls.

In the center, the data, before being processed further and evaluated, can be analyzed, among other things, for any irregularities in order to return any information to the meter, if required, when it is equipped for bidirectional radio traffic. For this purpose, the transceiver receiver of the meter affected can be addressed directly from the center, in principle. Preferably, there is now a frequency and protocol conversion after the long-distance communication from the center to the communication device, following the short-distance communication between communication device and meter. Thus, for instance a tariff input or other parameter settings can be influenced under remote control at the meter by the center in response to the meter data. Such a return message can occur in various communication devices just available for this purpose, in the interest of reliable radio transmission with minimum transmission energy requirement, suitably selectively through the relay function of at least that communication device which has the greatest proximity to the considered meter of known operating location through its instantaneous cell or GPS positioning.

The reliability of the packet data transmission from a meter through the relay function of the communication device to the center is increased if at least occasionally several mobile units that are equipped with such communication devices are located temporarily approximately simultaneously in the environment of a meter. This is because in this way, current data are communicated, slightly offset in time, from the same one of the cyclically transmitting meters through different radio paths to the center which, among other things, promotes the reliability of the data evaluations.

The communication device bidirectionally carrying out the relay function described is preferably an Internet-capable mobile telephone, a so-called smartphone which is professionally available to a contact person in their function as a mobile unit. The implemented mobile radio standard or an Internet link can then be utilized directly for the bidirectional long-distance link between mobile unit and center. In the case of bidirectional short-distance links between meter and mobile telephone, interventions into its circuit design may be required, for instance interventions by software for receiving and transmitting in ISM bands. However, at least the antenna circuit can be substantially retained since the ISM bands are located at 868 MHz, that is to say are not far apart from the European LTE uplink transmitting frequencies at 832 to 862 MHz. This correspondingly applies to the GSM technology which operates close to the ISM bands. Through the use of an app, the WLAN protocol can be provided in the mobile telephone for the short-distance links particularly between meter and communication device or, because of better interference resistance, preferably the wMbus protocol.

Other features which are considered as characteristic for the invention are set forth in the appended claims.

Although the invention is illustrated and described herein as embodied in a method for acquiring and communicating data of a smart-metering meter and a device for executing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing illustrates relay functions of various mobile units just included in the communication between a meter and a center.

DETAILED DESCRIPTION OF THE INVENTION

Referring now in detail to the single FIGURE of the drawing, which is not true to scale and only shows functionally important features of an exemplary application, there is seen a smart-metering installation which has a network 11 of a plurality of consumption measuring instruments with meters 12 (only one of which is indicated therein). Each meter 12 typically has a transceiver, the transmitter of which periodically sends out data packets for communicating a consumption measurement value accumulated at this consumer. Data packets individualized by meter or consumer addresses, coming from various meters 12, are received in normal operation (taken into consideration by using dashed lines in the drawing) through short-distance links 20 from a concentrator 13 operated stationarily, and typically through one of the ISM channels which are accessible free of license. The concentrator 13 thus exercises a relay function as it forwards the data packets received in an address-individualized form from different meters 12, through a long-distance link to the server of a center 14, typically in a mobile radio standard through mobile radio base stations. A server of the center 14 can be operated in the cloud 15, for instance for consumption accounting.

However, this procedure does not yet function, for example, in the case of a building project in which the concentrator 13 has not yet been put into operation because the transmitters of the meters 12 have not yet experienced their final positioning together with an antenna alignment which is oriented accordingly or may still be instantaneously operated in an assembly mode with greatly reduced transmitting power. Nevertheless, the center 14 can already have an economic or organizational interest in detecting current consumption situations, even if it is only to be able to infer possible disturbances in the energy supply system before the meter 12 in question from sudden fluctuations of the detected consumption.

According to the invention, a notification of this is provided for during this operating phase by the fact that a number of so-called mobile units 16 in this case is provided for the relay function between the meter 12 and the center 14. In particular, these are persons and/or vehicles which are equipped for this purpose with communication devices 17 because they are moving occasionally within the local area of the network 11. During this process, they unintentionally approach one of the meters 12 once so closely that its transmitter, in spite of non-ideal antenna alignment and/or in spite of reduced transmitting power can communicate its data packet to the communication device 17 of this mobile unit 16. The latter then transmits the data packet through a long-distance link 18 further to the center 14. In the latter, conclusions can be drawn, for instance regarding the operating characteristic of the consumer equipped with this meter 12 from this data packet or from data packets arriving in irregular sequence from the same meter 12. Control commands resulting therefrom for the acquisition of measurement values at the meter 12 can be communicated to the latter if it is equipped for bidirectional radio operation with a transceiver. In any case, a message about irregularities in the network 11 can be returned through the mobile radio long-distance link 18.

If it is uncertain which one of the mobile units 16 momentarily happens to be standing advantageously for such a return radio link, the return message, as a precaution, is preferably provided virtually in parallel through a number of mobile units 16 to be addressed from the center 14. Alternatively, position determinations are carried out by the meter 12 and the mobile units 16, for instance by GPS or according to mobile radio cells and are communicated to the center 14 together with the data packets. With this knowledge, instantaneously particularly advantageously positioned mobile units 16 can be selected directly from the center 14 for the return message through long-distance links 18.

For this purpose, it is particularly appropriate to implement the communication devices 17 of the mobile units 16 on the basis of mobile telephones, preferably mobile telephones which are Internet-capable for this purpose, so-called smartphones. These can communicate with the center 14 (and vice versa) bidirectionally over long distances through the implemented Internet or mobile radio standard. With regard to hardware or, for instance software through an app, they are constructed, on the other hand, to (also) handle bidirectional short-distance data radio 19 for instance through one of the ISM bands in the wMbus standard as explained in greater detail above.

If the relay function of a concentrator 13 operated stationarily is not yet functionally available, for instance in a construction phase, for the radio communication of data packets of a meter 12 linked into a smart-metering network 11 to a center 14, according to the invention mobile units 16 which are thus utilized for such relay functions at least occasionally move in the local environment of the network 11 and thus from time to time also in the vicinity of its meters 12. In particular, persons and/or vehicles which are equipped with communication devices 17 for long-distance links 18 in the Internet or in the mobile radio standard can serve as such mobile units 16 if mobile telephones are used as communication devices 17, they are then constructed by hardware or by software app for short-distance communication 19 with the meters 12, preferably through an ISM channel in the wMbus standard. Software interventions required for this purpose and/or the specification of a transmission protocol take place by using an app to the mobile telephone 17. In contrast, it is possible to directly use the Internet or mobile radio protocol implemented in smartphones, preferably with piggybacking of the meter data packets to be communicated to the center 14, for the long-distance communication 18 with the center 14.

The following is a summary list of reference numerals and the corresponding structure used in the above description of the invention:

11 network
12 meter (in 11)
13 concentrator (in 11)
14 center
15 cloud
16 mobile unit
17 communication device (of 16)
18 long-distance link and communication (17-14)
19 short-distance link and communication (12-17)
20 short-distance link and communication (12-13)

The invention claimed is:

1. A method for radio communication of data packets of a meter linked into a smart-metering network through a relay station to a center, the method comprising the following steps:
   locating at least one mobile unit, equipped with a communication device as the relay station, in an area of the network;
   using the communication device to receive at least one data packet over a short-distance link from the meter and establishing a long-distance link for communicating the at least one data packet to the center;
   carrying out a position determination by said at least one mobile unit and by the meter;
   communicating said position determinations to the center with said at least one data packet; and
   returning a message about irregularities in the network from the center to at least one mobile unit selected directly by the center, using an instantaneous position of said at least one mobile unit relative to the meter based on said position determinations.

2. The method according to claim 1, which further comprises providing at least one person equipped with the communication device as the mobile unit.

3. The method according to claim 1, which further comprises providing at least one vehicle equipped with the communication device as the mobile unit.

4. The method according to claim 1, which further comprises using the mobile unit when and where no short-distance link is operable from a meter to a concentrator.

5. The method according to claim 1, which further comprises using a mobile telephone link as the long-distance link.

6. The method according to claim 1, which further comprises operating the short-distance link under wMbus protocol over an ISM channel.

7. A device acting as a relay station for the radio communication of data packets from a meter in a smart-metering network to a center, the device comprising:
   a mobile unit equipped with a communication device being an Internet-capable mobile telephone configured for communication over ISM channels with respect to at least one of hardware or software;
   said mobile unit configured to carry out a position determination and communicate said position determination, and a position determination carried out by the meter, to the center, with the data packets; and
   said mobile unit configured to receive a return message about irregularities in the network from the center directed to said mobile unit based on an instantaneous position of said mobile unit relative to the meter based on said position determinations.

8. The device according to claim 7, which further comprises at least one app running on the mobile telephone providing at least one of software interventions or specification of a transmission protocol.

9. The device according to claim 8, wherein the transmission protocol is a WLAN protocol.

10. The device according to claim 8, wherein the transmission protocol is a wMbus protocol.

11. A system for the radio communication of data packets from a meter in a smart-metering network to a center, the meter configured to carry out a position determination, the system comprising:

at least one device acting as a relay station, including:
a mobile unit equipped with a communication device being an Internet-capable mobile telephone configured for communication over ISM channels with respect to at least one of hardware or software, said mobile unit configured to carry out a position determination and communicate said position determination, and the position determination carried out by the meter, to the center, with the data packets; and the center configured to directly select the at least one device based on an instantaneous position of said mobile unit relative to the at least one meter based on said position determinations and to return a message about irregularities in the network to the selected at least one device.

* * * * *